United States Patent [19]

Isogai et al.

[11] Patent Number: 5,121,261

[45] Date of Patent: Jun. 9, 1992

[54] DIGITAL VIDEO SIGNAL PROCESSING APPARATUS

[75] Inventors: Masaki Isogai, Tokyo; Tadashi Ohta, Yokohama, both of Japan

[73] Assignee: Nikon Corporation, Tokyo, Japan

[21] Appl. No.: 434,894

[22] Filed: Nov. 13, 1989

[30] Foreign Application Priority Data

Nov. 14, 1988 [JP] Japan .................................. 63-287315
Nov. 26, 1988 [JP] Japan .................................. 63-299024

[51] Int. Cl.$^5$ ............................................. H04N 7/14
[52] U.S. Cl. ............................................ 360/32; 379/93
[58] Field of Search .................. 360/10.1, 11.1, 32, 360/33.1, 35.1; 358/342, 336, 327, 85; 379/53, 93, 100

[56] References Cited

U.S. PATENT DOCUMENTS

| 4,086,615 | 4/1978 | Koubek | 358/32 |
| 4,560,833 | 12/1985 | Weber et al. | 379/53 |
| 4,763,208 | 8/1988 | Kawamura et al. | 360/10.1 |
| 4,816,929 | 3/1989 | Bradley et al. | 360/10.1 |
| 4,939,593 | 7/1990 | Yuuchi et al. | 360/11.1 |
| 4,943,994 | 7/1990 | Ohtsuka et al. | 358/85 |

Primary Examiner—Thomas G. Black
Attorney, Agent, or Firm—Shapiro and Shapiro

[57] ABSTRACT

A digital video signal processing apparatus comprising a reproducer, an adder and a signal processor. The reproducer reproduces an analog signal of a still image recorded on a disk-shaped recording medium and converts it into a digital signal. The adder adds at least a predetermined number of digital signals for the same image from the reproducer, and then outputs an added digital video signal. The signal processor accomplishes digital video signal processing of the digital video signal derived from the adder.

4 Claims, 6 Drawing Sheets

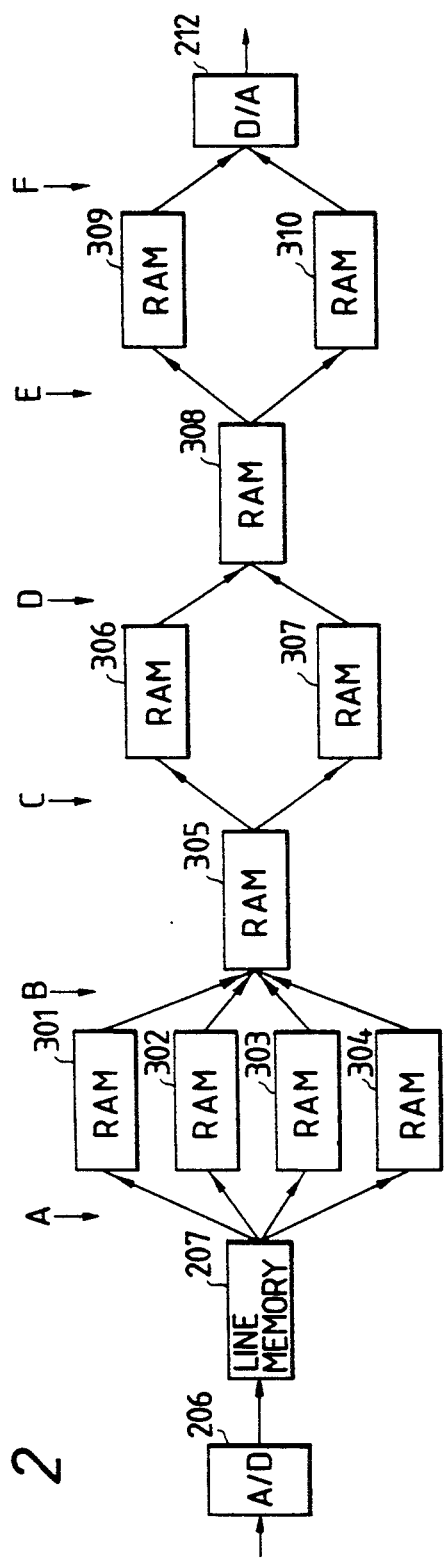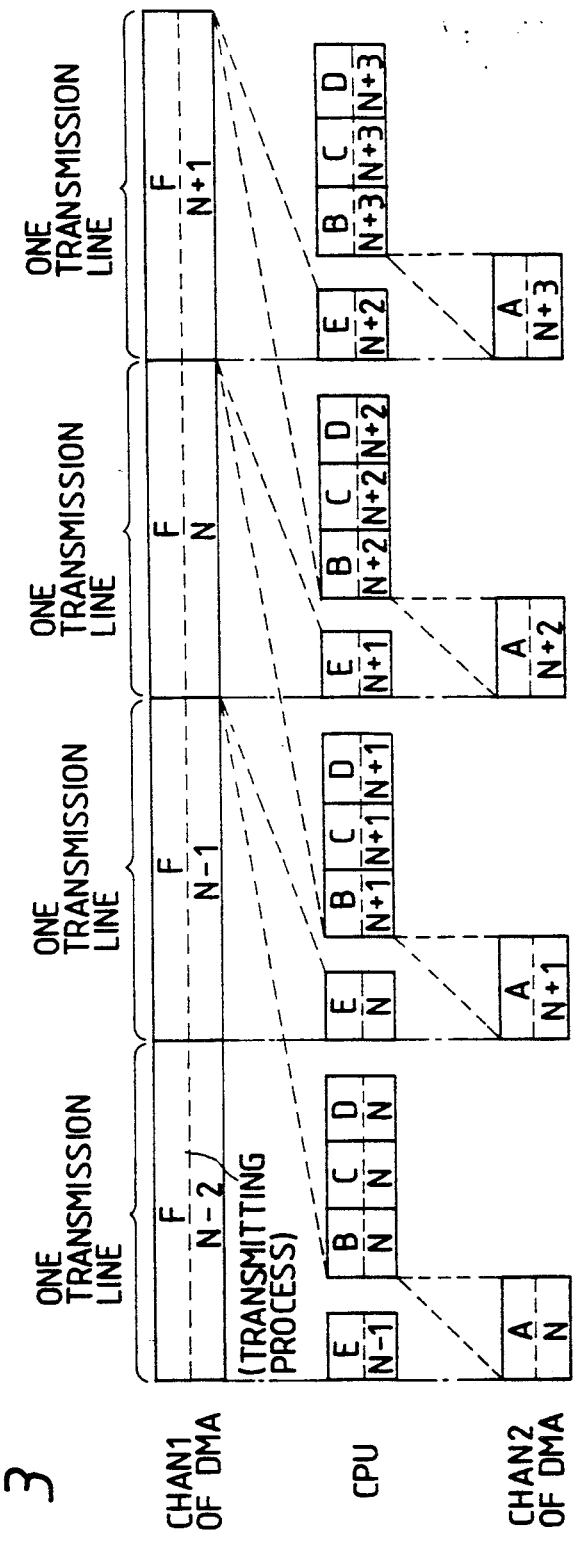
FIG. 2
FIG. 3

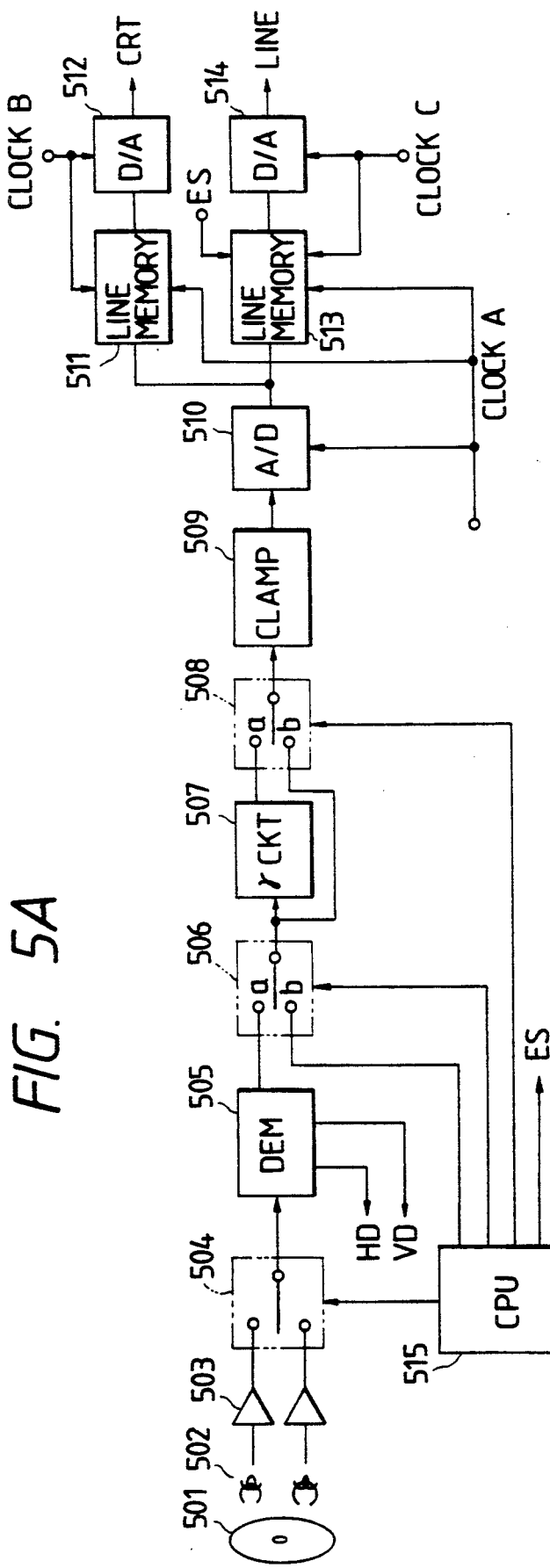
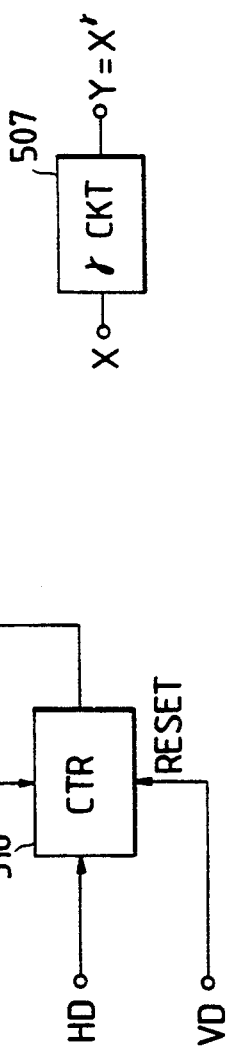
FIG. 5A
FIG. 5B

DIGITAL VIDEO SIGNAL PROCESSING APPARATUS

BACKGROUND OF THE INVENTION

1. Field of the Invention

The present invention relates not only to a video signal processing apparatus for converting a still image video signal read out of a magnetic disk into a still digital image signal, which in turn is digitally processed, but also to a still video transmitter which displays on a CRT a reproduced signal read out of a video floppy for an electronic still camera and transmits a transmitted and reproduced video signal through a telephone line to an electric transceiver which has been used in the field of an information medium. For instance, the above-described video signal processing apparatus can be applied to a video signal processing apparatus of a still video transmitter in the so-called electric transmission system which transmits to a remote electrical/ transceiver through a telephone line a still image recorded on a floppy disk in an analog manner.

2. Related Background Art

In the case of transmitting a still video image through an electric transmission system, the transmission side must carry out video signal processing such as gamma correction depending upon various conditions for the transmission of the image to be transmitted, such as whether or not the distribution of lightness is wide, whether the whole image is rather light or dark, that is, whether the whole tone of the image is bright or dark, the sensitivity characteristic of a receiver and so on. In the case of gamma correction in the conventional electric transmission system, the video signal is subjected to A/D conversion and the digitally converted video signal is subjected to image processing (for instance, digital gamma correction) by a digital signal processing technique on the side of transmission. In the case of the A/D conversion, according to the conventional technique, the A/D conversion is carried out by the analog signal reproduced by one field when one frame is recorded by one field or by two fields when one frame is recorded by two fields. According to such A/D conversion, the analog video signal which becomes the base of the A/D conversion includes jitter due to fluctuation in rotation of a disk drive device. In the case of a moving image, adverse effects of jitter may be visually neglected, but in the case of a still image, when a vertical line is included it is distorted. That is, the received still image is adversely affected. Furthermore, in the case of the A/D conversion, the received still image is adversely affected by noise added during the process of the A/D conversion.

According to the above-mentioned technique, in order to eliminate the adverse effect on the received still image, even a small degree of jitter must be eliminated. For this purpose, variation in rotation of a disk drive device must be completely eliminated. However, there exists a problem that in order to satisfactorily eliminate the fluctuation in rotation of the disk drive device, the cost of the disk drive device is considerably increased. Furthermore there is not available an effective means for eliminating noise added in the process of the A/D conversion of the reproduced analog signal.

In the conventional news field, by utilizing telephone lines, transmitters and receivers, the video signal is transmitted to branch offices at remote places. In this case, a film exposed by a silver salt camera is developed, and the developed image is printed on a photographic paper or enlarged to form a silver salt photograph. The silver salt photo thus processed is wound around a drum of an electric transmitter while a photographic paper is wound around the drum of an electric receiver. Both the transmitter and receiver drums are rotated synchronized with each other and scanned so that the signal is transmitted for each line.

However, in the case of the above-mentioned electric transmission system, it takes a lot of time to confirm the actual image after the image was exposed and furthermore, an installation such as a dark room is required. Moreover, the transmitter is large in size so that it is difficult to move it. As a result, a finished print must be carried to the place where the electric transmitter is installed. In the field of information media which fights the clock, the loss in time is a very serious problem.

SUMMARY OF THE INVENTION

A primary object of the present invention is therefore, the reduction in noise in the reproduced signal due to the fluctuation in rotation of a driver for spinning a disk for storing thereon information.

A first object of the present invention is to realize the elimination of the adverse effect of jitter due to the fluctuation in rotation of a disk drive device on a received still image without adding any expensive means and to substantially eliminate the adverse effect of noise added in the process for the A/D conversion of an analog still video signal.

A second object of the present invention is to provide a still video transmitter capable of transmitting through a telephone line or a wireless transmission system an image of a photo photographed at the actual spot immediately after the confirmation of a photo at the actual spot.

In order to attain the above-mentioned first object, a digital video image processing apparatus in accordance with the present invention comprises a reproducing means for reproducing a still video image recorded on a disk-shaped recording medium and outputting it in the form of a digital signal, an adder means for adding the digital signal of the same picture element of an image a plurality of times and a digital video signal processing means for accomplishing a digital video image signal process of digital still video signals added by said adder means. In the digital video signal processing apparatus of the type described above, in order to obtain one frame image (the digital frame image signal to be subjected to the digital signal processing), a plurality of signals are reproduced and added together so that influences due to the variation in rotation can be averaged and said plurality of reproduced and added signals are improved depending upon the number of additions made. Furthermore random noise added in the process of an A/D conversion after the reproduction can be decreased depending upon the number of additions.

In order to attain the second object of the present invention, a still video transmitter is provided with two line memories one of which is used for the confirmation of an image on the screen of a CRT and the other of which is for the electrical transmission. In order to input data to one of the line memories, a switch is actuated by a single A/D converter. Since only one A/D converter which requires a large quantity of electric power is used and the data is inputted into one of the two line memories by actuating the switch, normally the line memory for displaying an image on the screen of the CRT can be used so that a variation or fluctuation in time will not occur. Furthermore, since field/ frame conversion is carried out, a reproduced image without jitter and skew distortions can be viewed on the screen of the CRT. Only before deriving the data to be electrically transmitted, the switch is switched, so that the quality of the video signals on the screen of the CRT will not be adversely affected.

BRIEF DESCRIPTION OF THE DRAWINGS

FIG. 2 is a block diagram illustrating the flow of a signal through the embodiment shown in FIG. 1;

FIG. 3 is a time chart illustrating the timing of the signal processing in the first operation;

FIGS. 5A and 5B illustrate a block diagram of another preferred embodiment of the present invention;

DESCRIPTION OF THE PREFERRED EMBODIMENTS

A preferred Embodiment of a Digital Video Signal Processing Apparatus

Figure 1:
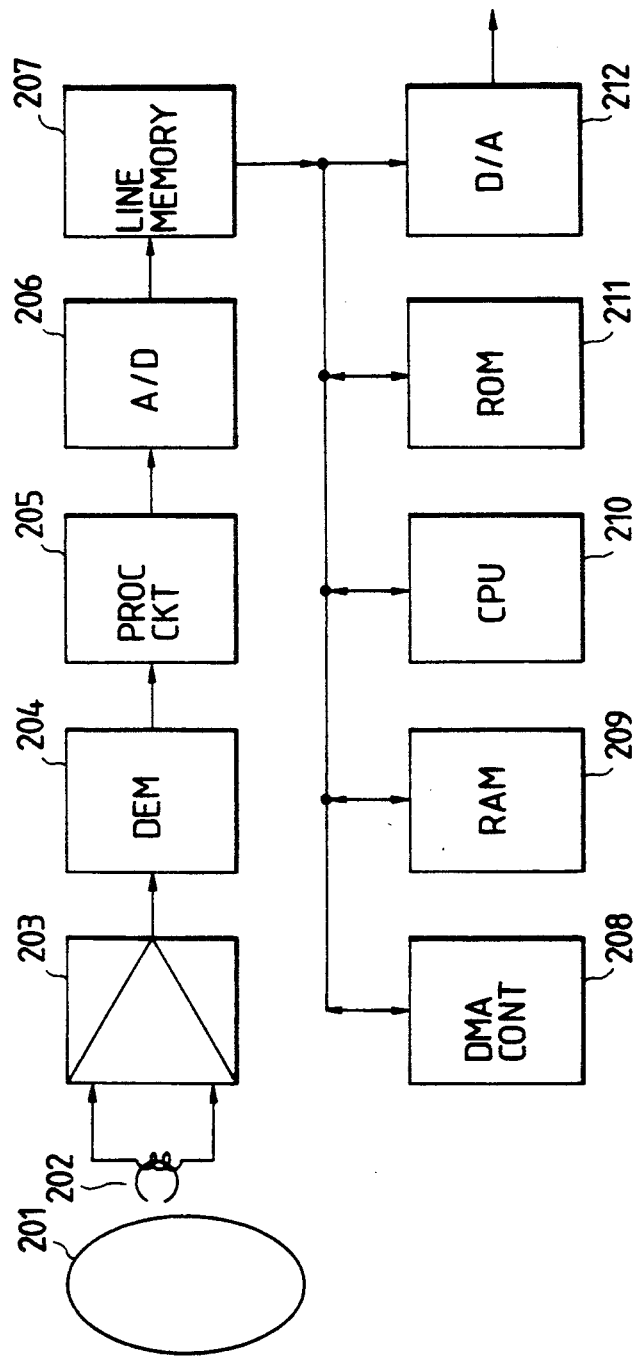
FIG. 1 is a block diagram of a preferred embodiment of a digital video signal processing apparatus in accordance with the present invention.

FIG. 1 is an example of a digital video signal processing apparatus according to the present invention as applied to an electrical transmission device which transmits an image to a remote receiver through a telephone line. A still image recorded on a floppy disk 201 in an analog manner is reproduced by a magnetic head 202 and a preamplifier 203 and then demodulated by a demodulator 204. Thereafter the demodulated signal is subjected to various signal processing by a process circuit 205. For instance, it is made to pass through a filter, subjected to gamma correction, clamping and the like. The processed analog signal from the process circuit 205 is converted into a digital signal by an A/D converter 206 and the scanning line data to be electrically transmitted are stored in a line memory 207. A direct memory access (DMA) controller 208 interconnects a memory, with another memory or I/0 and other component parts directly without passing through a central processor unit (CPU) 210 so that the data can be transmitted from one component part to another component part interconnected thereto at a high speed. The embodiment has two system channels and the channel 1 delivers data in a random access memory (RAM) 209 to a D/A converter 212. The channel 2 transmits the output from the line memory 207 to the RAM 209. The channel 1 is higher than the second channel 2 in priority. A read-only memory (ROM) 211 stores therein a program and a look up table (LUT) for carrying out gamma correction. CPU 210 controls the whole electrical transmitter and executes arithmetic operations.

Referring next FIG. 2, the mode of operation of the electrical transmitter with the above-described construction will be described.

FIG. 2 is a block diagram illustrating the flow of the digital video signal data processing when four additions are executed. In FIG. 2, A-F show the contents of the processings.

According to the embodiment, in the data processing, one scanning line data is defined as one unit. RAMs 301-310 represent a predetermined area of RAM 209 and provide a required capacity.

When the scanning line data of an image to be transmitted stored on the floppy disk 201 is read out by the magnetic head 202 and is made to pass through the preamplifier 203, the demodulator 204 and the processing circuit 205 and is converted into digital data by the A/D converter 206 and stored in the line memory 207, an interruption signal is delivered to CPU 210, which in turn uses the second channel 2 of DMA controller 208 in order to transmit the data from the line memory 207 to RAM 301. Next when the same line data is read out by the magnetic head 202 and is made to pass through the preamplifier 203, the demodulator 204 and the processing circuit 205, converted into the digital data by the A/D converter 206 and stored in the line memory 207, an interruption signal is delivered to CPU 210. CPU 210 uses the second channel 2 of the DMA controller 208 in order to transmit the data from the line memory 207 to RAM 302. In like manner, the same scanning line data is sequentially transferred to RAMs 303 and 304 and stored therein. The abovedescribed processing is carried out as the process A of FIG. 3. Thereafter the data stored in RAMs 301-304 are added for each pixel and the sum corresponding to each pixel is stored in RAM 305 in the process B shown of FIG. 3. Next the one scanning data which is added four times and stored in, RAM 305 is divided by 4 by CPU 210 in such a manner that even-numbered scanning data is stored in RAM 306 while odd-numbered scanning data is stored in RAM 307 in the process C shown in FIG. 3. Dropouts of the data stored in RAM 306 or 307 are detected by a dropouts detection means (not shown). When dropouts of the scanning data stored in RAM 306 or 307 are detected, the corresponding pixel data stored in the other RAM compensates the dropouts. The scanning line data whose dropouts are corrected is stored in RAMs 306 and 307 and is subjected to gamma correction by the digital processing carried out by CPU 210. The digital gamma correction is carried out using the LUT of ROM 211. Depending upon the electrical transmission systems, the direction of the main scanning is different. In this case, the processing for changing the direction of scanning is carried out and the data is stored in RAM 308 as shown in the process D of FIG. 3.

Data from RAM 308 is subjected to modulation for the purpose of the electrical transmission and even-numbered scanning line data is stored in RAM 309 while odd-numbered scanning line data is stored in RAM 310 as shown in the process E of FIG. 3. The channel 1 of the DMA controller 208 causes the RAMs 309 and 310 to alternately deliver one scanning line data to D/A converter 212 repeatedly. D/A converter 212 delivers a continuous analog scanning signal (analog video signal) as shown in the process F of FIG. 3.

FIG. 3 is a time chart of the processings A-F shown in FIG. 2. In FIG. 3, the lower portion below each block represents the numbers of the scanning lines.

In FIG. 3 the upper stage represents the processing F which is carried out by the first channel 1 of DMA controller 208. The intermediate stage represents the processings B, C. D and E which are carried out by CPU 210. The lower stage represents the processing A carried out by the second channel 2 of DMA controller.

The upper, intermediate and lower processing blocks can be simultaneously carried out.

Simultaneous with the process F which is started from the (N−1)-th scanning line data, the second channel 2 of DMA controller 208 delivers the data from the line memory 207 directly to RAMs 301–304 (the processing A).

CPU 210 modulates the N-th scanning line data stored in RAM 208 and stores it in RAM 309 (RAM 310) (the processing F). After the confirmation of storage of the (N+1)-th scanning line data stored in RAMs 301–304, the (N+1)-th scanning data is subjected to processes such as the execution for obtaining an arithmetic mean of addition, the dropouts correction, the digital gamma correction and the change in the direction of the scanning line and then the data thus processed is stored in RAM 308 (the processing B, C and D).

The signal for electrical transmission of the image stored in the floppy disk is constructed by repeating the above described processings. So far it is assumed that the video signal is sequentially scanned, but in the case of the actual video signal, the processings are carried out as follows.

In the case of the frame video signal, the odd-numbered lines correspond to an odd-numbered field while the even-numbered lines correspond to the even-numbered field. It follows therefore that the correspondence between the even-numbered and odd-numbered fields must be established. Furthermore in the case of the field video signal, each field contains video information only corresponding to only a half of an image. Therefore the processings A, B, C and D can be carried out only one time by two electrical transmission lines.

Figure 4:
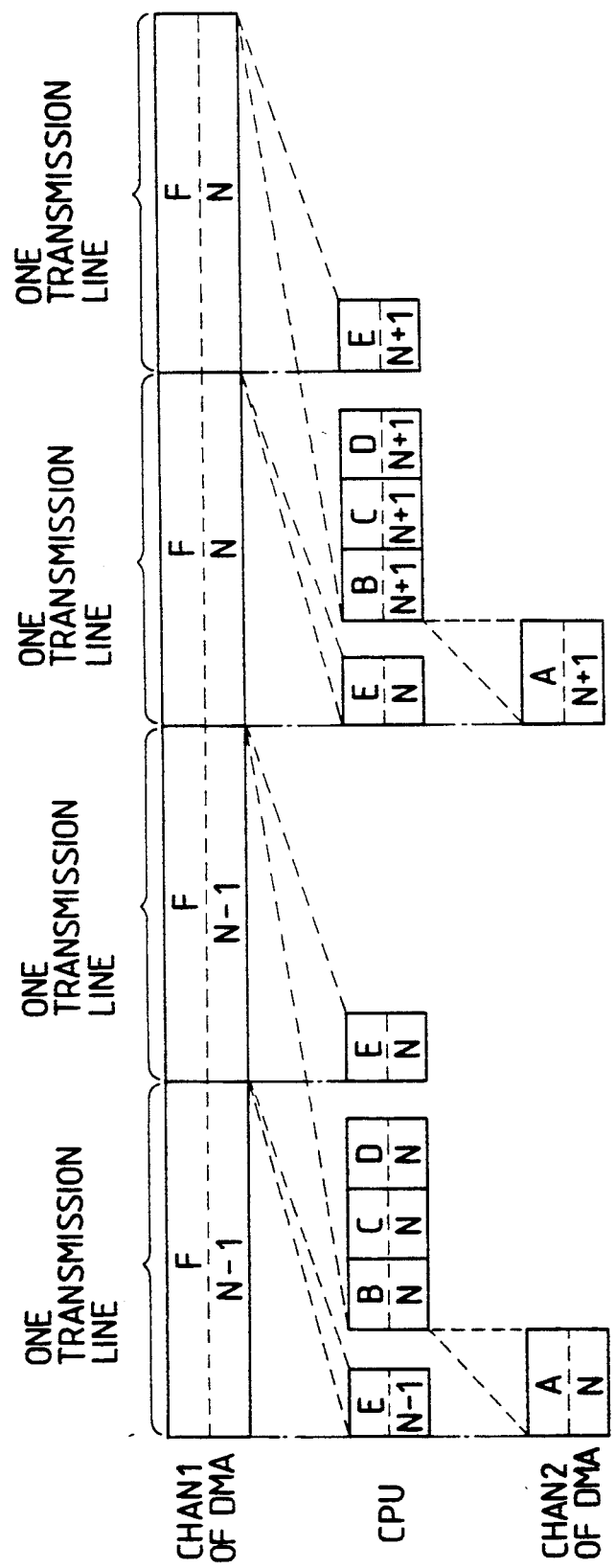
FIG. 4 is a time chart illustrating the processing of the signal in a second operation.

FIG. 4 shows a time chart illustrating the processing timing in the case of the field video signal.

As described above, according to the abovedescribed embodiment of the digital video signal processing apparatus of the present invention, after the still video signal recorded on a floppy disk is digitized, a few fields (frames), are averaged, so that as compared with the digital video signal obtained from a single field (or frame), the adverse effects due to jitter and noise which occur in the case of reproduction can be remarkably decreased and consequently high-quality still video data can be obtained.

An embodiment of a still video transmitter

FIG. 5A illustrates an improved embodiment of the present invention. RF signal is reproduced from a video floppy disk 501 by an in-line double gap head 502 and a preamplifier 503. A switch 504 switches the output from the head 502 and the vertical sync signal, the horizontal sync signal and the video signal reproduced by a demodulator 505. A switch or line signal switching circuit 506 replaces the line signal which is being transmitted and has a predetermined level by the video signal, and displays on a CRT which line is being transmitted. A gamma correction circuit 507 is explained with reference to FIG. 5B. In general, the conventional video signals are produced on the assumption that they may be displayed on a CRT. The tone display of this CRT is not linear (gamma=1), but is of the order of 2.2, so that the signals are previously corrected so that the gamma is 0.45. As a result, when the conventional video signal is caused to pass through the gamma correction circuit 507, the electrical transmission signals can be made to have a linear tone. A switch 508 is switched to the side of the gamma correction circuit 507 only in the case of the electrical transmission. A clamping circuit 509 maintains the video signal at a predetermined DC level and the output from the clamping circuit 509 is correctly converted into the digital signal. One of the outputs from the A/D converter 510 is stored in a line memory 511 for the CRT and then read out with a short time delay. Thereafter the digital signal is converted into an initial video signal by D/A converter 512 and its output is connected to the CRT. The writing clock A for supplying A/D converter and the line memory 511, which is produced extracting the horizontal sync signal from the reproduced video signal and multiplying by a PLL circuit (not shown), is a clock including time axis variation in the case of the reproduction. The clock B applied to the D/A converter 512 and furthermore used when the data is read out from the line memory 511 is generated by a crystal or the like and is completely free from time fluctuation. Another output from the A/D converter 510 is stored in the electrical transmission line memory 513 in synchronism with the clock A. In order to shift the video signal into the band of the telephone line, a CPU 515 generates a low frequency clock C and an enable signal ES which are delivered to the line memory 513 and the output from the line memory is delivered to the electrical transmission D/A converter 514 at a predetermined timing. When a counter 516 has counted the number of the horizontal sync signal HD preset by CPU 515, the signal CS rises to a HIGH level and the counter is reset in response to vertical sync signal VD. The line memory 513 is substantially similar in construction to the line memory 207 and the DMA controller 208, RAM 209 and ROM 211 shown in FIG. 1 are not shown in FIG. 5.

Figure 6:
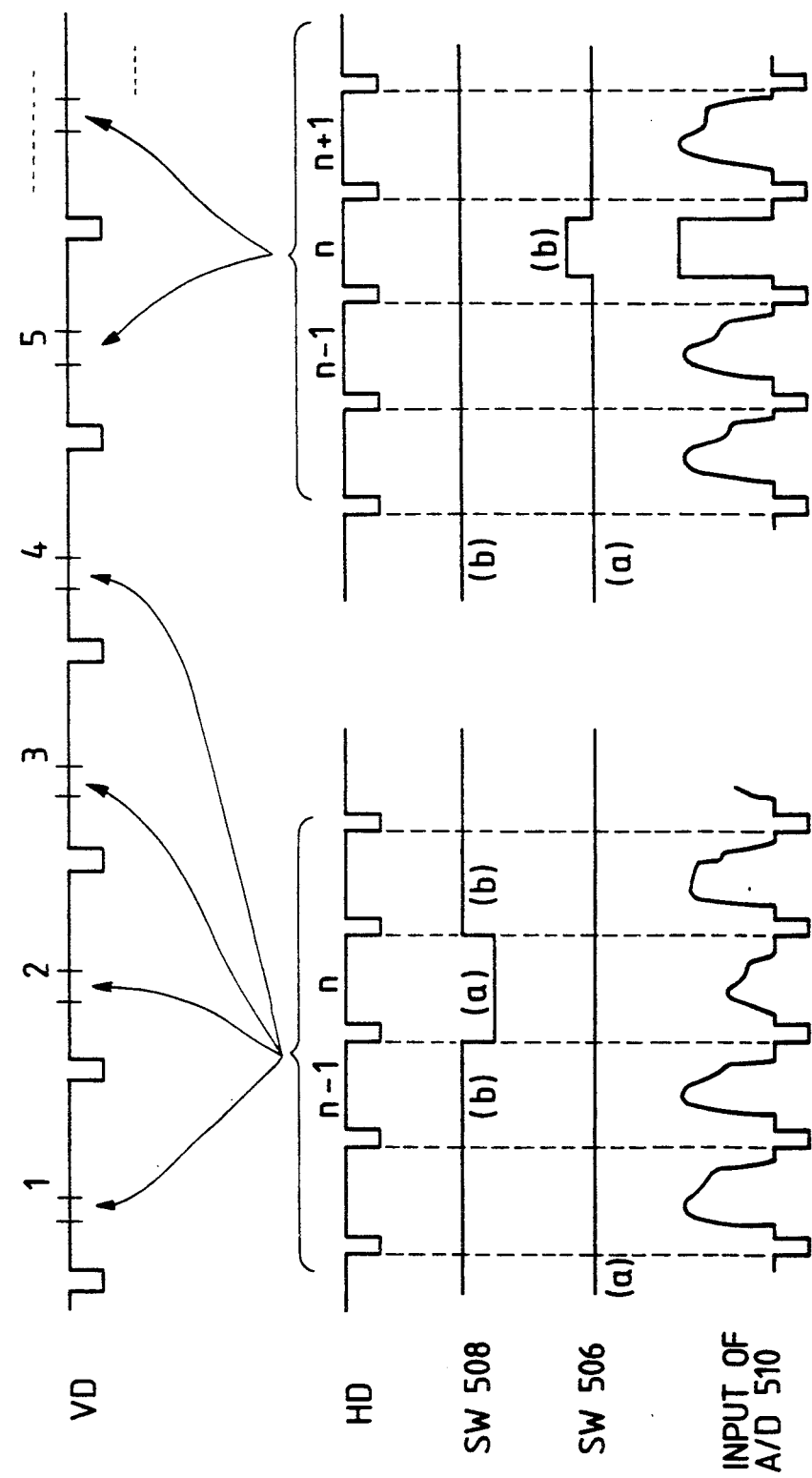
FIG. 6 is a time chart illustrating the mode of operation of the embodiment shown in FIG. 5A.
Figure 7:
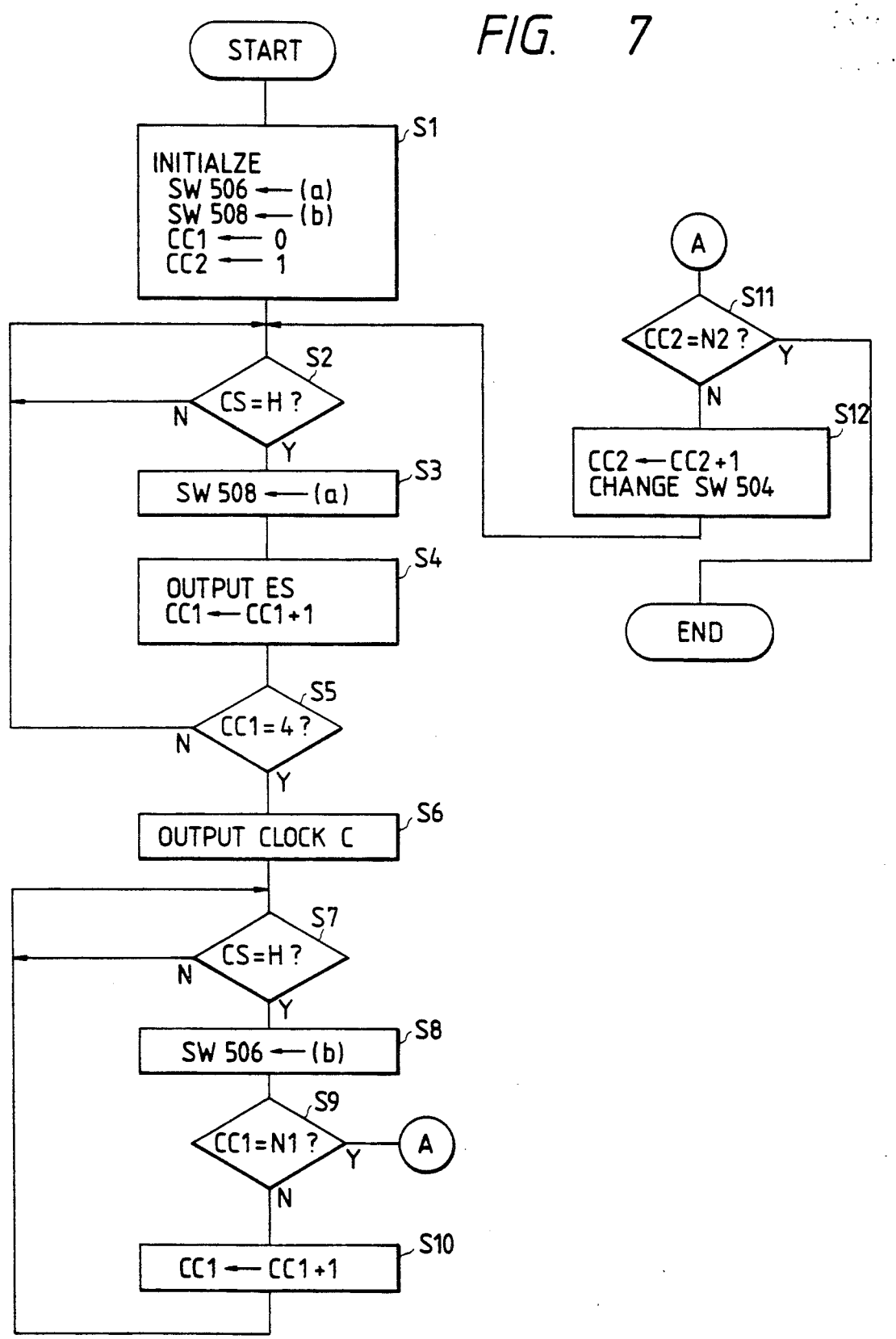
FIG. 7 is a flowchart illustrating the mode of operation of the embodiment shown in FIG. 5A.

Next referring to the time chart shown in FIG. 6 and the flowchart shown in FIG. 7, the mode of operation of the improved embodiment with the above-mentioned construction will be described.

First at the first step S1, CPU 515 is initialized. In this step, the switch 506 is switched to the contact a while the switch 508 is switched to the contact b; a counter CC1 in CPU 515 is set to zero; a counter CC2 within CPU 515 is set to 1; the content in the interior counter CC2 is preset into the counter 516; the switch 504 is so switched that the video signal corresponding to an odd-numbered field may be reproduced by the head 502; and the disk 501 is spun. At the step 2, the CPU detects whether or not the counter 516 has counted the number of the horizontal sync signal preset in response to signal CS. When the signal CS rises to a HIGH level, at the step S3, as shown in FIG. 6 the switch 508 is switched to a for a predetermined time interval. FIG. 6 shows the operation for the electrical transmission of the n-th video signal.

At the step S4, the enable signal ES is delivered to the line memory 513 and the content in the counter CC1 is incremented only by one. In response to the enable signal ES, the line memory 513 stores therein the video signal in synchronism with the clock A. At the step S5, whether or not the content in the interior counter CC1 becomes 4 is detected. When the content of the counter CC1 is not 4, the routine is shifted to the step 2. When four one-line video signals are stored in the line memory 513, the routine is shifted to the step S6 in which the clock C is delivered to the line memories 513 and D/A converter 514, whereby the electrical transmission is started. Simultaneous with the electrical transmission period of one line of video signal, the following processes are carried out in parallel with each other in the following steps.

At the step S7, the detection or decision similar to that made in the step S2 is carried out. When the signal CS rises to a HIGH level, as shown in FIG. 6, the switch 506 is switched to the contact b for a predetermined time interval. Since CPU 515 delivers the signal with a predetermined level to the contact b of the switch 506, an area of the screen of the CRT corresponding to the electrically transmitted video signal becomes blank. (Reference is made to the A/D converter 510 in the time chart shown, in FIG. 6).

At the step S9, the CPU detects whether the content of the interior counter CC1 is N1 or not. The value N1 is determined by the electrical transmission time interval of one line of video signal which depends on the rotational speed of the drum on the side of the receiver and the vertical sync signal. When CC1 is not equal to N1, the routine is shifted to the step S10 so that the content of the counter CC1 is incremented by 1. When CC1=N1, the routine is shifted to the step S11 in which the CPU detects whether or not the content in the interior counter CC2 is N2 corresponding to the number of horizontal scanning lines of one field of the video signal. When CC2=N2, the electrical transmission is interrupted. When the content of the interior counter CC2 is not equal to N2, the routine shifts to the step S12 in which the content of the interior counter CC2 is incremented by 1 and the switch 504 is so switched that the video signals for a different field may be reproduced. That is, when the video signals of the previous odd-numbered field are read out N1 times, in the succeeding step, the video signals of an even-numbered field are read out N1 times. When the step 12 is accomplished the routine is shifted to the step S2.

As described above, according to the improved embodiment of the present invention, only one A/D converter which operates at a high speed and consumes a large quantity of electric power is used, but two line memories are used and switched instantaneously so that the image is displayed on the screen of a CRT and can be electrically transmitted. Furthermore, the line memory for displaying the image on the screen of the CRT is normally used so that time axis variation can be eliminated and field/frame conversion is carried out, whereby one may view the reproduced image free from jitter and skew distortions. Moreover, the gamma converted signal is delivered to the electrical transmission line memory only at the instant when the switch is switched, when the data to be electrically transmitted is stored in the electrical transmission line memory, so that the distortions of other lines can be eliminated when the video signals are stored. Thus the distortion of the image displayed on the screen of the CRT can be prevented. In addition, on the screen of the CRT, the electrical transmission line signal is normally displayed, so that even when the gamma converted signal is displayed, its display continues only for a moment and can be visually neglected.

What is claimed is:

1. An apparatus for processing an analog signal of a still image recorded on a recording medium, comprising:
    reproduction means for reproducing a predetermined number of analog video signals corresponding to one and the same horizontal scanning line from said recording medium;
    converting means for converting each analog video signal reproduced by said reproduction means into a digital signal;
    adder means having a plurality of memory parts whose number is equal to said predetermined number, said adder means storing a digital signal corresponding to said one scanning line in each of said plurality of memory parts, respectively, adding the digital signals stored in said plurality of memory parts to each other and outputting a digital video signal corresponding to the added digital signals; and
    means for converting said digital video signal to an analog video signal that is delivered to a telephone circuit.

2. An apparatus as set forth in claim 1, wherein said adder means comprises a further memory part for storing the added digital signals.

3. An apparatus as set forth in claim 2, wherein said adder means comprises a pair of additional memory parts for storing digital signals stored in said further memory part that are divided into odd and even field digital signals, respectively.

4. An apparatus as set forth in claim 1, wherein said reproduction means comprises a magnetic head for reproducing high frequency signals recorded on a magnetic floppy disk, and a demodulation circuit for demodulating said high frequency signals into analog video signals corresponding to the intensity of light of an image.

* * * * *